(No Model.)
C. SCHERER & A. G. WILLIAMS.
POCKET BOOK FRAME.
No. 245,748. Patented Aug. 16, 1881.
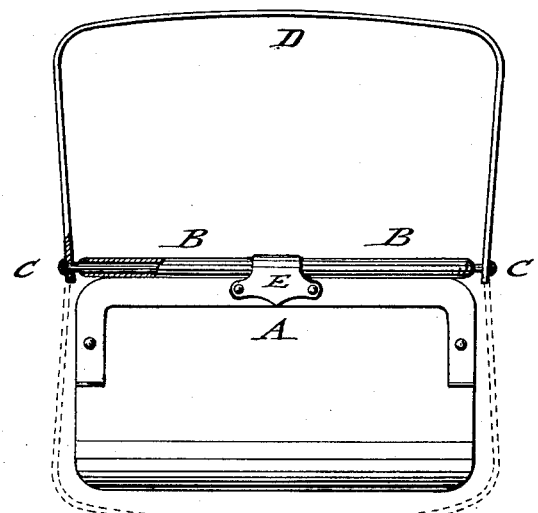
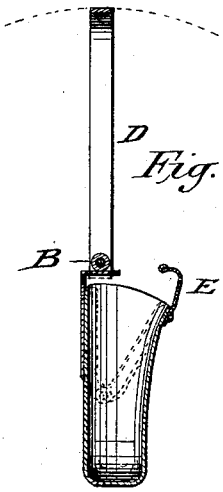
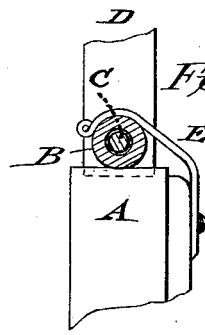
WITNESSES:
Carl Keyn
Otto Risch.
INVENTOR
Charles Scherer and
Alfred G. Williams
BY Paul Goepel.
ATTORNEY

United States Patent Office.

CHARLES SCHERER, OF BROOKLYN, NEW YORK, AND ALFRED G. WILLIAMS, OF NEWARK, NEW JERSEY, ASSIGNORS TO MORRIS RUBENS, OF NEW YORK, N. Y.

POCKET-BOOK FRAME.

SPECIFICATION forming part of Letters Patent No. 245,748, dated August 16, 1881.

Application filed March 18, 1881. (No model.)

*To all whom it may concern:*

Be it known that we, CHARLES SCHERER, of Brooklyn, county of Kings, and State of New York, and ALFRED G. WILLIAMS, of Newark, county of Essex, and State of New Jersey, have invented certain new and useful Improvements in Pocket-Book Frames, of which the following is a specification.

This invention has reference to an improved pocket-book frame of that class in which a barrel and locking devices are arranged at the top of the frame; and the invention consists of a pocket-book frame composed of two hinged or pivoted jaws, the one jaw being provided with a guard-plate and a rigid top barrel of the same length as the jaws, and the other being provided with a spring-clasp, which is adapted to be passed over the barrel and lock the jaws.

In the accompanying drawings, Figure 1 represents a side elevation of our improved pocket-book frame, partly in section. Fig. 2 is a vertical transverse section of the same, and Fig. 3 is a detail vertical transverse section of the spring-catch device.

Similar letters of reference indicate corresponding parts.

Referring to the drawings, A represents a pocket-book frame composed of the pivoted jaws F G. To the jaw F is attached an angular guard-plate, H, which serves to cover the joint between the jaws when the latter are closed, and as a support for the barrel B, which is soldered thereto. The barrel B being of the same length as the frame strengthens it and preserves its symmetry. This barrel is adapted to receive a loose spindle, C, to the ends of which is riveted a handle or bail, D, which handle is of such a size and shape as to extend around the pocket-book when thrown over the same, as shown in dotted lines in Fig. 1. When the handle or bail B is thrown up the pocket-book is suspended therefrom and can be readily and conveniently carried. The pocket-book frame A is closed by means of a spring-clasp, E, which is attached to the inner jaw of the frame A and bent in such a manner as to extend over the barrel of the outer jaw. It is outwardly curved at its end, so that it can easily pass over the barrel, the bent portion being raised thereby until it clasps the barrel and connects the inner jaw rigidly to the outer jaw, as shown in Fig. 3.

In this manner a simple, cheap, and effective spring-clasp for pocket-book frames is obtained.

We do not claim a pocket-book provided with a bail adapted to be swung over the book to hold the same closed.

Having thus described our invention, we claim as new and desire to secure by Letters Patent—

The pocket-book frame consisting of two hinged or pivoted jaws, the one jaw provided with a guard-plate and a rigid barrel of the same length as the jaws, the other provided with the spring-clasp, which is adapted to be passed over the barrel and lock the jaws, substantially as described.

In testimony that we claim the foregoing as our invention we have signed our names, in presence of two witnesses, this 8th day of March, 1881.

CHARLES SCHERER.
ALFRED G. WILLIAMS.

Witnesses:
PAUL GOEPEL,
CARL KARP.